United States Patent
Merritt et al.

(10) Patent No.: US 9,502,870 B2
(45) Date of Patent: Nov. 22, 2016

(54) WIRE SUPPORT MEMBER FOR AN ENVIRONMENTAL CONTROL SYSTEM

(71) Applicant: Hamilton Sundstrand Corporation, Windsor Locks, CT (US)

(72) Inventors: Brent J. Merritt, Southwick, MA (US); Kenneth Crawford, Manchester, CT (US); John Perella, Monson, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 37 days.

(21) Appl. No.: 14/619,578

(22) Filed: Feb. 11, 2015

(65) Prior Publication Data

US 2016/0233653 A1   Aug. 11, 2016

(51) Int. Cl.
*H02G 3/02* (2006.01)
*H01B 7/00* (2006.01)
*F16M 13/02* (2006.01)

(52) U.S. Cl.
CPC ............... *H02G 3/02* (2013.01); *F16M 13/02* (2013.01); *H01B 7/0045* (2013.01)

(58) Field of Classification Search
USPC ................... 174/153 G, 72 R, 72 A
See application file for complete search history.

(56) References Cited

U.S. PATENT DOCUMENTS

| | | | |
|---|---|---|---|
| 2,382,970 A * | 8/1945 | Borcherdt | F16L 5/08 126/317 |
| 2,419,761 A | 4/1947 | Bruce | |
| 2,447,152 A | 8/1948 | Baker | |
| 3,151,905 A * | 10/1964 | Reuther | B60R 16/00 174/152 G |
| 3,689,193 A | 9/1972 | Riehl | |
| 3,705,949 A | 12/1972 | Weiss | |
| 4,097,012 A | 6/1978 | McIntyre | |
| 4,234,012 A | 11/1980 | Schupback | |
| 4,654,967 A | 4/1987 | Thenner | |
| 4,775,286 A | 10/1988 | Gillette et al. | |
| 5,105,054 A | 4/1992 | Kirma | |
| 5,452,871 A * | 9/1995 | Sauber | F16L 3/10 174/149 R |
| 5,597,980 A | 1/1997 | Weber | |
| 5,598,795 A | 2/1997 | House | |
| 5,918,837 A | 7/1999 | Vicain | |
| 6,230,585 B1 | 5/2001 | Bator | |
| 7,014,152 B2 | 3/2006 | Grendahl | |
| 7,285,027 B2 | 10/2007 | McGrath et al. | |
| 7,507,906 B2 | 3/2009 | Suzuki | |
| 7,905,454 B2 | 3/2011 | Sanatgar et al. | |
| 8,113,472 B2 | 2/2012 | Wippler et al. | |
| 8,668,173 B2 | 3/2014 | Knobloch | |

(Continued)

*Primary Examiner* — Timothy Thompson
*Assistant Examiner* — Krystal Robinson
(74) *Attorney, Agent, or Firm* — Kinney & Lange, P.A.

(57) ABSTRACT

A wire support member for supporting the wiring of an environmental control system. The wire support member has a base edge, a first edge, and a second edge, the first and second edges form a V-shaped apex opposite the base edge. The ratios of the diameter of a first fastener opening through the wire support member to a length from the center of the first fastener opening to the first edge, and of the diameter of the first fastener opening to a length from the center of the first fastener opening to the second edge optimize the routing and support for the wiring.

15 Claims, 3 Drawing Sheets

(56) References Cited

U.S. PATENT DOCUMENTS

| | | |
|---|---|---|
| 8,876,073 B2 | 11/2014 | Richey |
| 8,921,699 B2 | 12/2014 | Al-Ali et al. |
| 8,979,056 B2 | 3/2015 | Mayo et al. |
| 9,236,720 B2 | 1/2016 | Ichikawa et al. |
| 9,273,719 B2 | 3/2016 | Grifka |
| 9,353,890 B2 | 5/2016 | Dickinson et al. |
| 2005/0217888 A1 | 10/2005 | Arai et al. |
| 2006/0178246 A1 | 8/2006 | Tjerrild |
| 2007/0257160 A1 | 11/2007 | Cushion |
| 2008/0169675 A1 | 7/2008 | Hebert |
| 2009/0173844 A1 | 7/2009 | Huo |
| 2009/0230243 A1 * | 9/2009 | Army ................. B64C 7/00 244/118.5 |
| 2010/0032531 A1 | 2/2010 | Getts |
| 2012/0091292 A1 | 4/2012 | Hahn et al. |
| 2012/0325983 A1 | 12/2012 | Vrame |
| 2013/0140055 A1 | 6/2013 | Adachi et al. |
| 2013/0161940 A1 | 6/2013 | Rossato et al. |
| 2013/0292159 A1 | 11/2013 | Gotou et al. |
| 2013/0320155 A1 | 12/2013 | Okabe |
| 2013/0323473 A1 | 12/2013 | Dietsch et al. |
| 2013/0344790 A1 * | 12/2013 | Army ................. B64D 13/06 454/152 |
| 2014/0158454 A1 | 6/2014 | Kikuta |
| 2014/0306071 A1 | 10/2014 | Stechmann |
| 2014/0326836 A1 | 11/2014 | Kim et al. |
| 2014/0332639 A1 | 11/2014 | Ahlem et al. |
| 2016/0066473 A1 | 3/2016 | Tsuboi et al. |
| 2016/0161052 A1 | 6/2016 | Griggs |

\* cited by examiner

WIRE SUPPORT MEMBER FOR AN ENVIRONMENTAL CONTROL SYSTEM

BACKGROUND

The present disclosure relates to aircraft environmental control systems (ECS), and more specifically to mounting systems for components of an ECS. An ECS utilizes cabin air compressors to condition air for delivery to an aircraft cabin. The pressure and temperature of the aircraft cabin must be maintained throughout a wide variety of flight conditions. A pack control unit (PCU) communicates with and receives feedback from cabin air compressor modules to ensure that the temperature and pressure of the aircraft cabin remains at sufficient levels. The PCU communicates with the cabin air compressor modules through wiring that is routed from the PCU to each module. The wiring must be routed and supported such that the wiring will not interfere with other parts of the ECS and will not wear through.

SUMMARY

According to an embodiment of the present invention, a wire support member for an environmental control system includes a first side, a second side, a first edge, a second edge, and a base edge. The first edge and the second edge form a V-shaped apex opposite the base edge. A first fastener opening having a center C and a diameter D1, a second fastener opening, and a third fastener opening, the first second and third fastener openings extending from the first side to the second side. A length L1 from the center C to the first edge and a length L2 form the center C to the second edge. A ratio of length L1 to diameter D1 is between 2.0 and 2.3.

According to another embodiment of the present invention, a wire support assembly for an environmental control system includes a wiring for the environmental control system, a first wire support member, a second wire support member, and a third wire support member. The wiring includes a first wire bundle extending from a pack control unit and branching into a second wire bundle and a third wire bundle, the second wire bundle extends from the first wire bundle to an outboard module, and the third wire bundle extends from the first wire bundle to an inboard module. The first wire support member is mounted to a first backbone support structure and supports the first wire bundle, the second wire bundle, and the third wire bundle. The second wire support member is mounted to an outboard support structure of the outboard module and supports the second wire bundle between the first wire support member and the outboard module. The third wire support member is mounted to a first compressor casing of the inboard module and supports the third wire bundle between the first wire support member and the inboard module. The third wire support member includes a first side, a second side, a first edge, a second edge, and a base edge. The first edge and the second edge form a V-shaped apex opposite the base edge. A first fastener opening having a center C and a diameter D1, a second fastener opening, and a third fastener opening, the first second and third fastener openings extending from the first side to the second side. A length L1 from the center C to the first edge and a length L2 from the center C to the second edge. A ratio of length L1 to diameter D1 is between 2.0 and 2.3.

DETAILED DESCRIPTION

Figure 1:
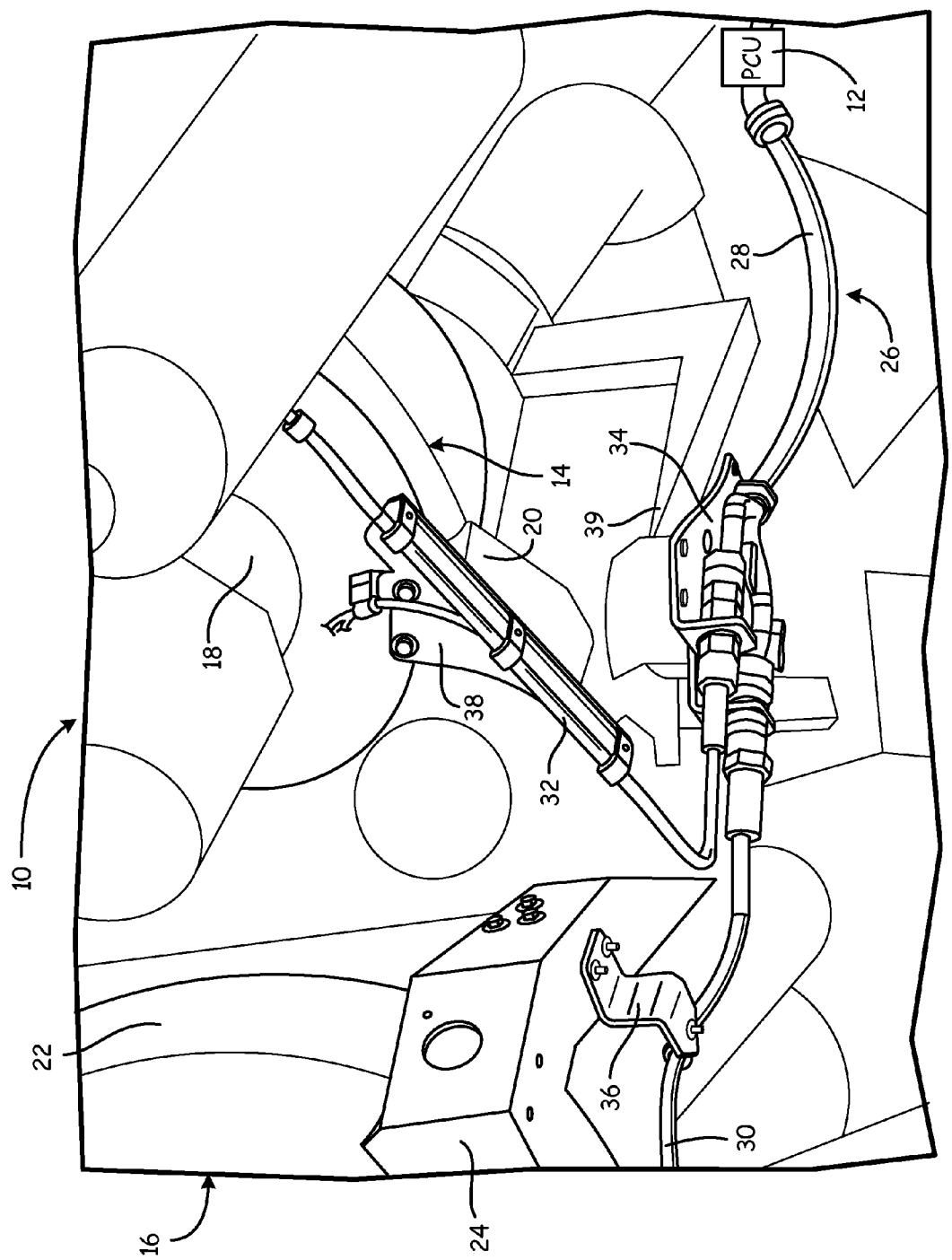
FIG. 1 is a perspective view of a wire harness support system for an aircraft environmental control system.

FIG. 1 is a perspective view of a wire harness support system for an aircraft environmental control system (ECS) 10. ECS 10 includes pack control unit 12 (PCU), inboard module 14, and outboard module 16. Inboard module 14 includes inboard cabin air compressor 18 and module support structure 20. Outboard module 16 includes outboard cabin air compressor 22 and module support structure 24. ECS 10 also includes wiring 26 extending from PCU 12 to inboard module 14 and outboard module 16. Wiring 26 includes first wire harness 28, second wire harness 30, and third wire harness 32. Wiring 26 is supported by first wire support member 34, second wire support member 36, and third wire support member 38. ECS 10 further includes backbone support structure 39 for supporting ECS 10 and various other modules of ECS 10.

First wire harness 28 is connected to PCU and supported by first wire support member 34. First wire harness 28 splits to form second wire harness 30 and third wire harness 32. Both second wire harness 30 and third wire harness 32 are supported by first wire support member 34. Second wire harness 30 is connected to, and extends from, first wire harness 28, and second wire harness 30 is also connected to outboard module 16. As second wire harness 30 proceeds from first wire support member 34 to outboard module 16, second wire harness 30 is supported by second wire support member 36. First wire support member 34 is mounted to backbone support structure 39 and optimizes the routing of first wire harness 28, second wire harness 30, and third wire harness 32. Second wire support member 36 is mounted to module support structure 24 and optimizes the routing of second wire harness 30. Third wire support member 38 is mounted to a housing of inboard module 14 and optimizes the routing of third wire harness 32.

Similar to second wire harness 30, third wire harness 32 is connected to and extends from first wire harness 28. Third wire harness 32 extends from first wire harness 28 to inboard module 14. Third wire harness 32 is supported by third wire support member 38 as third wire harness 32 proceeds from first wire support member 34 to inboard module 14. As third wire harness 32 proceeds along third wire support member 38, third wire harness 32 splits to include a main bundle and a secondary bundle. Both the main bundle and the secondary bundle are supported by and routed by third wire support member 38.

Third wire support member 38 is mounted to a housing of inboard module 14. Fasteners extend through fastener openings (best seen in FIG. 2) of third wire support member 38 and into the housing of inboard module 14 to secure third wire support member 38. Third wire support member 38 supports third wire harness 32 and optimizes the routing of third wire harness 32 to inboard module 14, which prevents third wire harness 32 from inadvertently contacting various components of ECS 10 that may have an effect on the operation of third wire harness 32.

Figure 2:
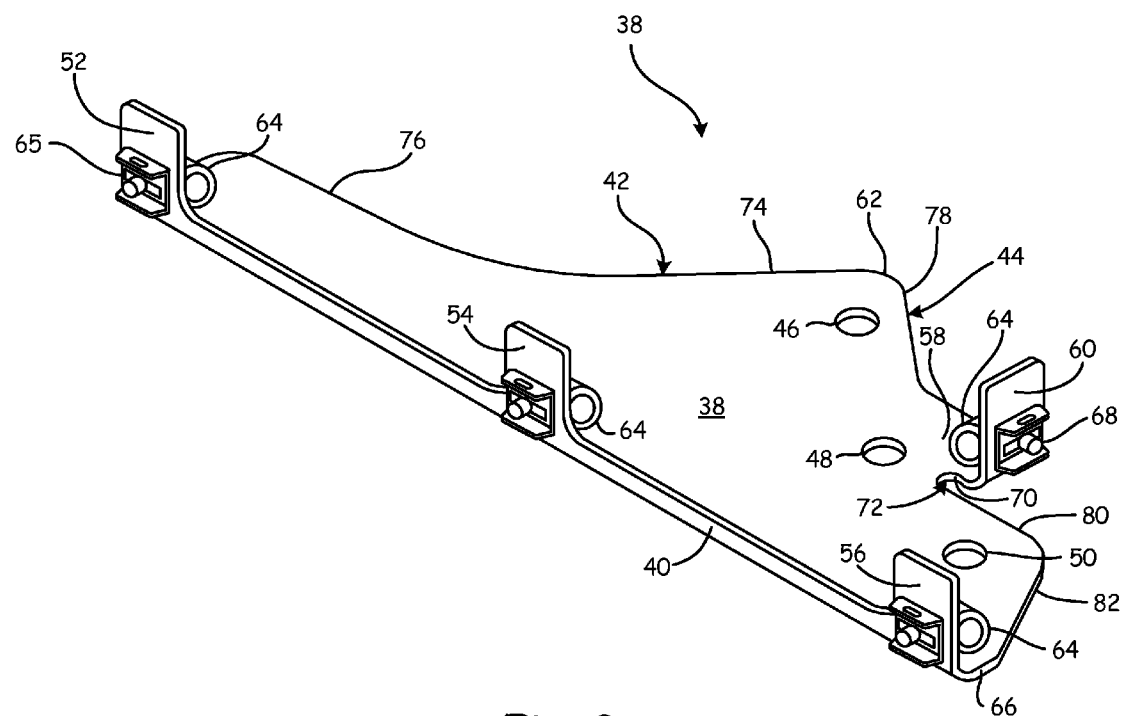
FIG. 2 is a perspective view of a wire support member.

FIG. 2 is a perspective view of third wire support member 38. Third wire support member 38 includes base edge 40, first edge 42, and second edge 44. First fastener opening 46, second fastener opening 48, and third fastener opening 50 extend through third wire support member 38. Base edge 40 includes first flange 52, second flange 54, and third flange 56. Base edge 40 is L-shaped and extends upward from a flat portion of third wire support member 38 to provide support for flanges 52, 54, and 56. Second edge 44 includes arm 58, and arm 58 includes fourth flange 60. First edge 42 and second edge 44 meet to form V-shaped apex 62 opposite base edge 40. V-shaped apex 62 is rounded to prevent third wire harness 32 from catching on V-shaped apex 62, which could impact the operation of third wire harness 32. It is understood that V-shaped apex can take other shapes, such as squared or polygonal, and may include filets to prevent sharp edges. Each of the first flange 52, second flange 54, third flange 56, and fourth flange 60 includes clamp 64. Base edge 40 further includes first end 65 and second end 66. Arm 58 further includes top edge 68 and bottom edge 70. First edge 42 further includes sloped portion 74 and first horizontal portion 76. Second edge 44 further includes first sloped portion 78, second horizontal portion 80, and second sloped portion 82. Bottom edge 70 and a second horizontal portion 80 of second edge 44 define notch 72.

As third wire harness 32 proceeds from first wire support member 34 to inboard module 14, third wire harness 32 must be supported and routed to ensure that third wire harness 32 does not excessively wear due to contract with various parts of ECS 10. Clamps 60 support third wire harness 32 as it proceeds along base edge 40 towards inboard module 14. Third wire harness 32 splits into the main bundle and the secondary bundle, both of which proceed to inboard module 14, and the main bundle continues along base edge and is supported by flange 52. The secondary bundle diverges from the main bundle and is supported by and routed by flange 56. To prevent third wire harness 32 and the main and secondary bundles clamps 60, 62 may further include an elastomer cushion arranged between clamp 60, 62 third wire harness 32. While third wire support member 38 has been described as including clamps 60, 62 it is understood that any suitable retaining mechanism may be employed to secure and route third wire support member 38.

In one embodiment, first edge 42 is perpendicular to second edge 44. In other embodiments, first edge 42 may intersect second edge 44 to form an acute angle or an obtuse angle. It is also understood that first edge 42 and second edge 44 may run parallel for a portion before meeting to form V-shaped apex 62.

First flange 52, second flange 54, and third flange 56 carry third wire harness 32 in such a way that third wire harness 32 will not contact a surface of third wire support member 38 during aircraft operation. Fourth flange 60 also carries a portion of third wire harness 32 that splits from the main portion of third wire harness 32 (best seen in FIG. 1). Maintaining third wire harness 32 in a floating position away from contact with third wire support member 38 prevents wear-induced failure of third wire harness 32, which ensures that communication is maintained between PCU 12 and inboard module 14.

Third wire support member 38 is made from a lightweight material to reduce the weight impact on the aircraft caused by third wire support member 38, the lightweight material being sufficiently rigid to support the wiring throughout the flight envelope of the aircraft. Third wire support member 38 may be coated or uncoated. In the present embodiment, third wire support member 38 is made from aluminum or an aluminum alloy. It is understood, however, that third wire support member 38 may be made of any suitable material for supporting and routing the wiring throughout the flight envelope of the aircraft without having a significant weight impact on the aircraft, such as titanium or a titanium alloy, or carbon fiber.

Additionally, while first flange 52, second flange 54, third flange 56, and fourth flange 60 are described as including clamps 60, it is understood that the flanges 52, 54, 56, 58 may include any suitable retaining mechanism for routing third wire harness 32 that will not cause wear damage to third wire harness 32. Clamps 60 may also include a cushion, such as a cushion made from an elastomer material, disposed between the clamp and third wire bundle 32 to protect third wire bundle 32 from wear.

Figure 3:
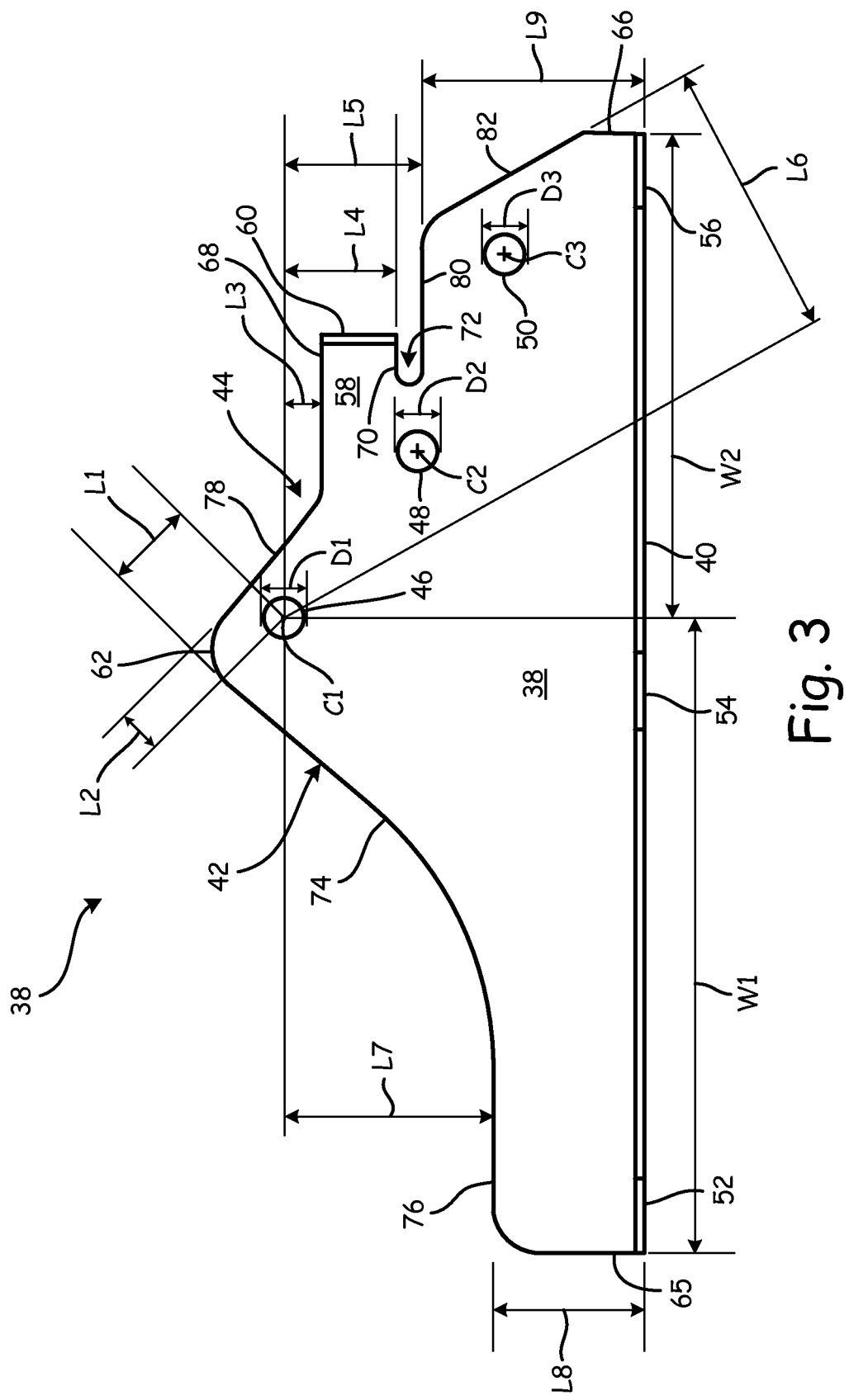
FIG. 3 is an elevation view of a wire support member.

FIG. 3 is an elevation view of third wire support member 38. Third wire support member 38 includes base edge 40, first edge 42, and second edge 44. First fastener opening 46, second fastener opening 48, and third fastener opening 50 extend through third wire support member 38. Base edge 40 includes first flange 52, second flange 54, and third flange 56. Second edge 44 includes arm 58, and arm 58 includes fourth flange 60. First edge 42 and second edge 44 meet to form V-shaped apex 62 opposite base edge 40. Base edge 40 further includes first end 65 and second end 66. Arm 58 further includes top edge 68 and bottom edge 70. First edge 42 further includes sloped portion 74 and first horizontal portion 76. Second edge 44 further includes first sloped portion 78, second horizontal portion 80, and second sloped portion 82. Bottom edge 70 and a second horizontal portion 80 of second edge 44 define notch 72.

While first edge 42 is described as including sloped portion 74 and first horizontal portion 76, it is understood that first edge 42 may take any suitable shape for allowing third wire support member 38 to support and route third wire harness 32. For example, first edge 42 may include a single slope between V-shaped apex 62 and first end 65 of base edge. Similarly, while second edge 44 is defined as including first sloped portion 78, second horizontal portion 80, and second sloped portion 82, it is understood that second edge 44 may take any suitable shape for allowing third wire support member 38 to support and route third wire harness 32. For example, second edge 44 may include a single slope between V-shaped apex 62 and second end 66, with flange 60 projecting directly from second edge 44.

First fastener opening 46 has center C1 and diameter D1. Second fastener opening 48 includes center C2 and diameter D2. Third fastener opening 50 includes center C3 and diameter D3. First fastener opening 46 is oriented such that the dimensioning of various other components of third wire support member 38 may be located from center C1 of first fastener opening 46.

Length L1 is a distance from center C1 to sloped portion 74 of first edge 42. Length L2 is a distance from center C1 to first sloped portion 78 of second edge 44. Length L3 is a distance from center C1 to a top edge 68 of arm 58. Length L4 is a distance from center C1 to bottom edge 70 of arm 58. Length L5 is a distance from center C1 to second horizontal portion 76 of second edge 44. Length L6 is a distance from center C1 to second sloped portion 78 of second edge 44. Length L7 is a distance from center C1 to first horizontal portion 76 of first edge 42. Length L8 is a distance from center C1 to an apex of notch 72. Length L8 is a distance from base edge 40 to first horizontal portion 76 of first edge 42. Length L9 is a distance from base edge 40 to second horizontal portion 80. Width W1 is a distance between center C1 and first end 65 of base edge 40. Width W2 is a distance between center C1 and second end 66 of base edge 40. A height of notch 72 is defined as the difference between length L4 and length L5. Additionally, a height of arm 58 is defined as the difference between length L4 and length L3.

First fastener opening 46, second fastener opening 48, and third fastener opening 50 are arranged in an arcuate arrangement. In this way, center C1, center C2, and center C3 all fall on a common arc. First flange 52, second flange 54, and third flange 56 are arranged equidistantly along base edge 40. Fourth flange 60 is perpendicular to first flange 52, second flange 54, and third flange 56 to provide sufficient routing and support for the secondary portion of third wire bundle 32 as the secondary portion separates from the main portion and proceeds to inboard module 14. Fasteners extend through first fastener opening 46, second fastener opening 48, and third fastener opening 50 to secure third wire support member 38 to a housing of inboard module 14.

Length L1 is between 0.860 inches (2.184 centimeters) and 0.920 inches (2.337 centimeters). Length L2 is between 0.470 (1.193 centimeters) inches and 0.530 inches (1.347 centimeters). Diameter D1 is between 0.401 inches (1.018 centimeters) and 0.411 inches (1.044 centimeters). A ratio of length L1 to diameter D1 is between 2.0 and 2.3. A ratio of length L2 to diameter D1 is between 1.1 and 1.4.

In the present embodiment, length L3 is about 0.375 inches (0.953 centimeters). Length L4 is about 1.130 inches (2.870 centimeters). Length L5 is about 1.385 inches (3.518 centimeters). Length L6 is about 2.780 inches (7.061 centimeters). Length L7 is about 2.140 inches (5.436 centimeters). Width W1 is about 6.430 inches (16.332 centimeters). Width W2 is about 4.945 inches (12.560 centimeters). As a height of notch 72 is defined by the difference between length L4 and length L5, notch 72 has a height of about 0.255 inches (0.648 centimeters). It is understood that all lengths and widths may vary within acceptable engineering tolerances, such as by about 0.030 inches (0.076 centimeters).

While length L9 is shown as greater than length L8, it is understood that lengths L8 and L9 may be the same length, or length L9 may be shorter than length L8. In this way, lengths L8 and L9 may be optimized to route third wire harness 32 depending on the orientation of various other components of within ECS 10. Similarly, width W1 is shown as greater than width W2. However, it is to be understood that width W1 may be the same as width W2 or smaller than width W2.

Third wire support member 38 is mounted to a housing of inboard module 14 (shown in FIG. 1). This locates third wire support member 38 at a location that reduces the amount of strain imparted on third wire support member 38 by third wire harness 32 by efficiently routing third wire harness 32 from first wire support member 34 to inboard module 14 in such a way that the total length of third wire harness 32 is minimized. This location also optimizes the routing of the main bundle and the secondary bundle separating from third wire harness 34 and proceeding to inboard module 14. Mounting third wire support member 38 to a housing of inboard module 14 also ensures that second wire harness 30 and third wire harness 32 do not become entangled as the two wire harnesses exit first wire support member 34. This mounting also allows third wire support member 38 to remain lightweight as third wire support member 38 does not have to carry as heavy of a load.

Third wire support member 38 must be able to support the weight of third wire harness 32 throughout the envelope of flight conditions, while also maintaining the routing of third wire harness 32 to ensure constant communication between inboard module 14 and PCU 12. The ratio of length L1 to diameter D1 ensures that third wire support member 38 maintains the routing and support of third wire harness 32 and that third wire support member 38 is sufficiently lightweight and compact. Similarly, the ratio of length L2 to diameter D1 also ensures that third wire support member 38 maintains the routing and support of third wire harness 32 and that third wire support member 38 is sufficiently lightweight and compact.

Discussion of Possible Embodiments

The following are non-exclusive descriptions of possible embodiments of the present invention.

A wire support member for an environmental control system, the wire support member includes a first side and a second side, a first edge, a second edge, and a base edge, the first edge and the second edge forming a V-shaped apex opposite the base edge, a first fastener opening having a center C and a diameter D1, a second fastener opening, and a third fastener opening, the first second and third fastener openings extending from the first side to the second side, a length L1 from the center C to the first edge and a length L2 from the center C to the second edge, and a ratio of L1 to D1 between 2.0 and 2.3.

The wire support member of the preceding paragraph can optionally include, additionally and/or alternatively, any one or more of the following features, configurations and/or additional components:

The length L1 can be between 0.860 inches (2.184 centimeters) and 0.920 inches (2.337 centimeters) and the diameter D1 can be between 0.401 inches (1.018 centimeters) and 0.411 inches (1.044 centimeters).

The wire support member can include a length L2 from the center C to the second edge, and a ratio of length L2 to diameter D1 can be between 1.1 and 1.4.

The length L2 can be between 0.470 (1.193 centimeters) inches and 0.530 inches (1.347 centimeters) and diameter D1 can be between 0.401 inches (1.018 centimeters) and 0.411 inches (1.044 centimeters).

The base edge can include a plurality of flanges extending perpendicularly from the base edge.

The plurality of flanges can each include a clamp secured to the flange.

The wire support member can include an arm extending from the second edge, the arm including a flange extending perpendicularly from the arm, and the flange including a clamp secured to the flange.

A wire support assembly for an environmental control system, the wire support assembly includes a wiring for the environmental control system having a first wire bundle extending from a pack control unit and branching into a second wire bundle and a third wire bundle, the second wire bundle extending from the first wire bundle to an outboard module, and the third wire bundle extending from the first wire bundle to an inboard module, the wire support assembly also includes a first wire support member mounted to a first backbone support structure, the first wire support member supporting the first wire bundle, the second wire bundle, and the third wire bundle, a second wire support member mounted to an outboard support structure of the outboard module, the second wire support member supporting the second wire bundle between the first wire support member and the outboard module, and a third wire support member mounted to a first compressor casing of the inboard module, the third wire support member supporting the third wire bundle between the first wire support member and the inboard module, the third wire support member includes a first side and a second side, a first edge, a second edge, and a base edge, the first edge and the second edge forming a V-shaped apex opposite the base edge, a first fastener opening having a center C and a diameter D1, a second fastener opening, and a third fastener opening, the first second and third fastener openings extending from the first side to the second side, a length L1 from the center C to the first edge and a length L2 from the center C to the second edge, and a ratio of L1 to D1 between 2.0 and 2.3.

The wire support assembly of the preceding paragraph can optionally include, additionally and/or alternatively, any one or more of the following features, configurations and/or additional components:

The third wire support member can be mounted to the first compressor casing by fasteners extending through the first, second, and third fastener openings.

The length L1 can be between 0.860 inches (2.184 centimeters) and 0.920 inches (2.337 centimeters) and the diameter D1 can be between 0.401 inches (1.018 centimeters) and 0.411 inches (1.044 centimeters).

A ratio of length L2 to diameter D1 can be between 1.1 and 1.4.

The length L2 can be between 0.470 (1.193 centimeters) inches and 0.530 inches (1.347 centimeters) and diameter D1 can be between 0.401 inches (1.018 centimeters) and 0.411 inches (1.044 centimeters).

The base edge can include a plurality of flanges extending perpendicularly form the base edge.

Each of the plurality of flanges can include a clamp mounted to the flange with the third wire bundle secured by the clamps.

The third wire support member can include an arm extending from the second edge, the arm having a flange extending perpendicularly from the arm, and the flange including a clamp attached to the flange.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A wire support member for an environmental control system, the wire support member comprising:
   a first side and a second side;
   a first edge, a second edge, and a base edge, the first edge and the second edge forming a V-shaped apex opposite the base edge;
   a first fastener opening having a center C and a diameter D1, a second fastener opening, and a third fastener opening, the first second and third fastener openings extending from the first side to the second side;
   a length L1 from the center C to the first edge and a length L2 from the center C to the second edge; and
   wherein a ratio of length L1 to diameter D1 is between 2.0 and 2.3.

2. The wire support member of claim 1, wherein length L1 is between 0.860 inches (2.184 centimeters) and 0.920 inches (2.337 centimeters) and diameter D1 is between 0.401 inches (1.018 centimeters) and 0.411 inches (1.044 centimeters).

3. The wire support member of claim 1, wherein a ratio of length L2 to diameter D1 is between 1.1 and 1.4.

4. The wire support member of claim 3, wherein the length L2 is between 0.470 (1.193 centimeters) inches and 0.530 inches (1.347 centimeters) and diameter D1 is between 0.401 inches (1.018 centimeters) and 0.411 inches (1.044 centimeters).

5. The wire support member of claim 1, wherein the base edge further comprises a plurality of flanges extending from the base edge perpendicular to the first side.

6. The wire support member of claim 5, wherein each of the plurality of flanges includes a clamp secured to the flange.

7. The wire support member of claim 1 further comprising an arm extending from the second edge, the arm including a flange extending perpendicularly from the arm, and the flange including a clamp secured to the flange.

8. A wire support assembly for an environmental control system, the wire support assembly comprising:
   a wiring for the environmental control system comprising:
      a first wire bundle extending from a pack control unit and branching into a second wire bundle and a third wire bundle;
      the second wire bundle extending from the first wire bundle to an outboard module; and
      the third wire bundle extending from the first wire bundle to an inboard module;
   a first wire support member mounted to a first backbone support structure, the first wire support member supporting the first wire bundle, the second wire bundle, and the third wire bundle;
   a second wire support member mounted to an outboard support structure of the outboard module, the second wire support member supporting the second wire bundle between the first wire support member and the outboard module; and
   a third wire support member mounted to a first compressor casing of the inboard module, the third wire support member supporting the third wire bundle between the first wire support member and the inboard module, the third wire support member comprising:
      a first side and a second side;
      a first edge, a second edge, and a base edge, the first edge and the second edge forming a V-shaped apex opposite the base edge;
      a first fastener opening having a center C and a diameter D1, a second fastener opening, and a third fastener opening, the first second and third fastener openings extending from the first side to the second side;
      a length L1 from the center C to the first edge and a length L2 from the center C to the second edge; and
      wherein a ratio of length L1 to diameter D1 is between 2.0 and 2.3.

9. The wire support assembly of claim 8, wherein the third wire support member is mounted to the first compressor casing by fasteners extending through the first, second, and third fastener openings.

10. The wire support assembly of claim 8, wherein length L1 is between 0.860 inches (2.184 centimeters) and 0.920 inches (2.337 centimeters), and the diameter D1 is between 0.401 inches (1.018 centimeters) and 0.411 inches (1.044 centimeters).

11. The wire support assembly of claim 8, wherein a ratio of length L2 to diameter D1 is between 1.1 and 1.4.

12. The wire support member of claim 11, wherein the length L2 is between 0.470 (1.193 centimeters) inches and 0.530 inches (1.347 centimeters) and diameter D1 is between 0.401 inches (1.018 centimeters) and 0.411 inches (1.044 centimeters).

13. The wire support assembly of claim 8, wherein the base edge further comprises a plurality of flanges extending perpendicularly from the base edge.

14. The wire support assembly of claim 13, wherein each of the plurality of flanges including a clamp mounted to the flange, the third wire bundle secured by the clamps.

15. The wire support assembly of claim 8 further comprising an arm extending from the second edge, the arm including a flange extending perpendicularly from the arm, and the flange including a clamp attached to the flange.

* * * * *